Patented July 22, 1941

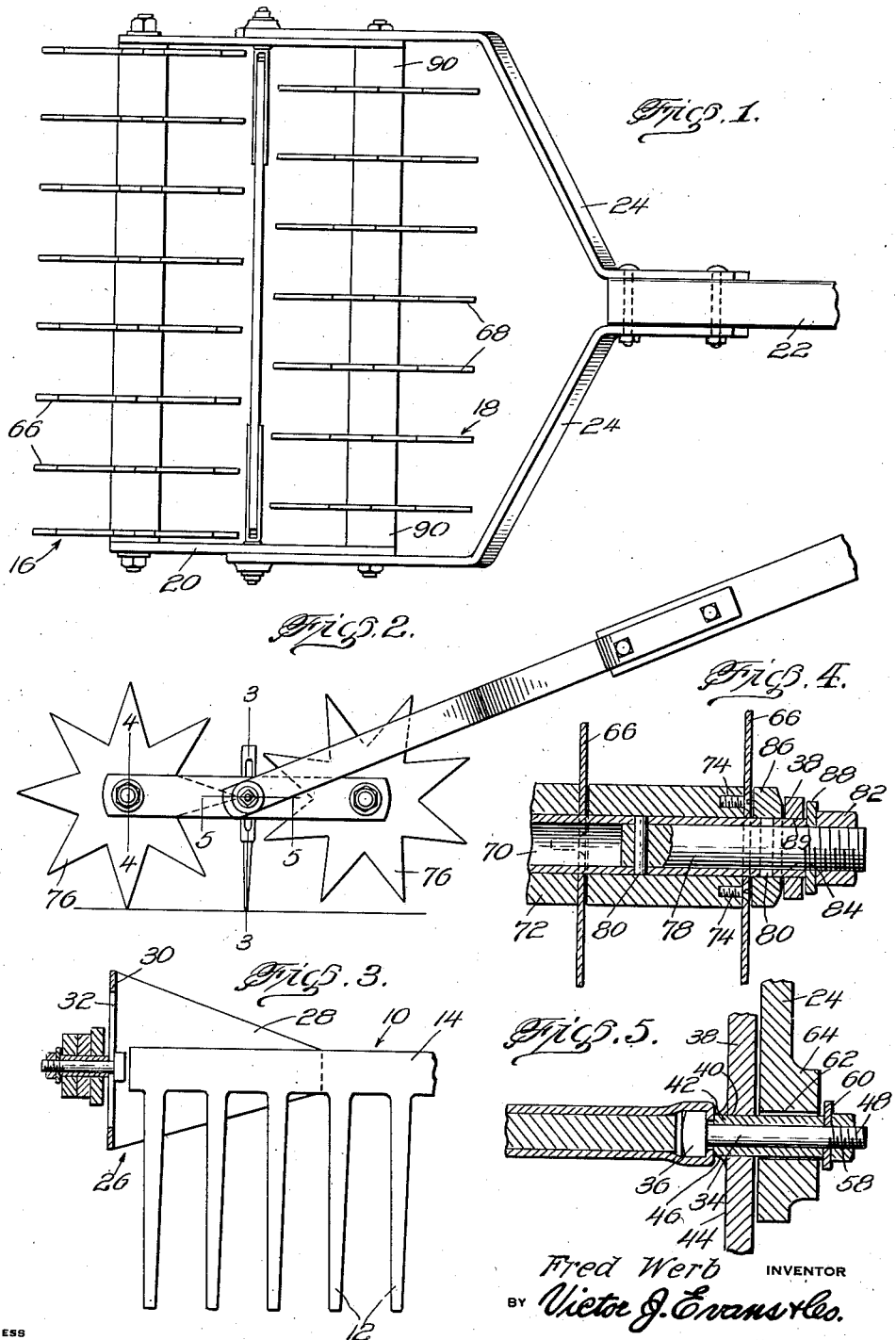

2,250,075

UNITED STATES PATENT OFFICE 2,250,075

GARDEN DISK RAKE

Fred Werb, Willow Grove, Pa.

Application May 29, 1939, Serial No. 276,437

2 Claims. (Cl. 97—61)

My invention relates to soil cultivating means, and has among its objects and advantages the provision of an improved garden disk rake.

An object of my invention is to provide a device of the type described in which rotary disk cultivating means are associated with the rake tines for cooperation therewith in which a novel frame is connected with the rake tine assembly for supporting the rotary disk means. More specifically, I provide a gang of rotary blades on each side of the tine assembly, together with means for adjusting the gangs vertically varying their cultivating depth with respect to the rake tines. The blades in one of the rotary gangs are staggered with respect to the blades in the other gangs, and all the blades are star shaped so as to embody sharp points capable of effectively breaking lumps.

In the accompanying drawing,

Figure 1 is a plan view of a garden disk rake embodying my invention;

Figure 2 is a side elevational view;

Figure 3 is an enlarged fragmentary sectional view along the line 3—3 of Figure 2;

Figure 4 is an enlarged fragmentary sectional view along the line 4—4 of Figure 2; and Figure 5 is an enlarged fragmentary sectional view along the line 5—5 of Figure 2.

In the embodiment selected to illustrate my invention, I make use of a rake unit 10 embodying the usual tines 12 formed integrally with the back 14. Rake unit 10 is positioned between rotary units 16 and 18, both of which are carried by a frame 20, which in turn is supported by the rake unit. A conventional rake handle 22 is connected with the frame 20 through the medium of bars 24 so as to permit manipulation in the manner of a conventional rake.

To each end of the back 14 I connect a U-shaped bracket 26, formed of sheet metal. The flanges 28 of the brackets are welded to the back 14 and their bights 30 are spaced slightly from the ends of the back 14. Brackets 26 are identical in construction. Referring to Figures 3 and 5, the bracket 26 illustrated therein is provided with a vertical slot 32 in its bight 30 for the reception of a bolt 34 having its head 36 lying inside the bight. Frame 20 includes a bar 38 which is bored at 40 for the reception of a sleeve 42 which has one end projecting slightly beyond the face 44 of the bar 38 to be positioned in abutting relation with the bight 30. Sleeve 42 is fixedly secured to the bar 38, as by welding at 46.

Bolt 34 extends through the sleeve 42 and is threaded at 48 for the reception of a nut 50 between which and the end of the sleeve 42 is positioned a washer 60. Sleeve 42 extends through a bore 62 in the associated bar 24 and a boss 64 welded to the bar. The sleeve 42 fits loosely in the bore 62 so that the bar 24 may pivot on the sleeve as an axis. At the same time, the sleeve is of such length as to support the washer 60 in slightly spaced relation with the face of the boss 64 so as to prevent any binding action on the bar 24 when the nut 58 is tightened. Thus the bolt 34 may be fixedly related to the bracket 26 through mere tightening of the nut 58. Such tightening of the nut will clamp the bight of the bracket between the head 36 and the adjacent end of the sleeve 42.

Slots 32 are of such lengths as to permit considerable vertical adjustment of the bolts 34. Thus the frame 20 may be adjusted vertically so as to secure precise positioning of the rotary disk units 16 and 18. The position will depend on the nature of the soil being cultivated.

Disk unit 16 comprises a plurality of disk-like blades 66 spaced equal distances apart, while the unit 18 comprises a group of similar blades 68 spaced equal distances apart, but offset with respect to the blade 66. Figure 4 illustrates the manner in which the blades 66 are mounted on their supporting structure, as well as the manner in which the blades are associated with the frame 20.

Both blade units 16 and 18 are identical in construction so that the description of one will apply to both. Upon the metal tube 70 I mount a plurality of spacers 72 each of which is fixedly related to one of the blades 66. Spacers 72 rotate freely on the tube 70. Each blade 66 is provided with a plurality of openings for the reception of screws 74 which are threaded into the associated spacer 72, so that one blade 66 and the associated spacer 72 rotate as a unit upon the tube 70.

Figure 2 illustrates the blades 66 and 68 as being provided with sharp points 76 so as to embody a formation capable of penetrating lump soil.

In Figure 4, a stud bolt 78 is positioned inside the tube 70 and is fixedly related thereto by key pins 80. One end of the stud bolt projects beyond the end of the tube 70 for the reception of a nut 82. The associated bar 38 is provided with a bore 84 for the reception of the tube 70, and a spacer 86 is positioned between the bar 38 and the adjacent blade 66. A washer 88 is mounted on the stud bolt 78 between the end of the tube 70 and the nut 82. Washer 88 is clamped in position and holds the bar 38 in assembled relation with the tube 70.

Figure 4 illustrates the spacers 86 associated with the unit 16. The spacers 90 associated with the blade unit 18 are longer than the spacers 86, so as to compensate the additional spacing of the adjacent blades 68 from the bars 38. It will thus be seen that the bars 38 in combination with the two tubes 70 and the stud bolts 78 provide a frame, designated 20, which serves as a mount for the two rotary blade assemblies 16 and 18. The frame is rotatable about the bolt 34 as an axis.

The device functions as a leveling and pulverizing implement manipulated in the manner of an ordinary garden rake. The disks will cut and break down the lump pile, and the rake located between the two disk units will level the soil and at the same time rake up lumps to be cut by the following gang of rotary blades. The rotary gangs will effectively break down lumps which cannot be broken down by an ordinary break. An important feature of my invention is the fact that the discs may rotate individually about their respective supporting tube 70. Thus, a retarded rotation of one or more disks in connection with the lump pile will not interfere with the operation of other disks operating in soil of different texture. Thus each disk will perform its individual function completely independently of the other disks in that gang. The unit is adjustable so that the disks may be shifted vertically relatively to the rake tines to satisfy the needs of a particular type of soil. The rake unit 10 is fixedly related to the frame 20 through the medium of the bolts 34 so that the tines 12 will be positively supported at the correct angularity as the gangs 16 and 18 operate in the soil. Bars 24 are rotatably related to the sleeves 40 notwithstanding tightening of the nuts 58.

Without further elaboration, the foregoing will so fully illustrate my invention that others may, by applying current knowledge, readily adapt the same for use under various conditions of service.

I claim:

1. A soil cultivating implement comprising a tined rake unit, a frame, bracket connection means between the frame and the tined rake unit, a handle connected with the frame for manipulating the tined rake unit, and a gang of soil cutting tools rotatably related to said frame, said bracket connection means including means for adjusting the gang of soil cutting tools vertically with respect to the tined rake units.

2. A soil cultivating implement, comprising a tined rake unit, brackets secured on both ends of the unit and each provided with a wall having a vertical slot therein, a frame vertically adjustably supported by said brackets through the medium of the slots, a handle carried by the frame, and a gang of soil cutting tools rotatably supported in the frame on each side of the tined rake unit.

FRED WERB.